United States Patent [19]

Moore

[11] Patent Number: 5,632,948

[45] Date of Patent: May 27, 1997

[54] METHOD OF MANUFACTURING HAND COVERING WITH ATTACHED PAD

[75] Inventor: Barrett H. Moore, Glencoe, Ill.

[73] Assignee: Megladon Industries, Cayman Islands

[21] Appl. No.: 575,218

[22] Filed: Dec. 20, 1995

[51] Int. Cl.$^6$ .................................................. B28B 1/30
[52] U.S. Cl. ........................... 264/243; 264/275; 264/279; 264/303; 264/304; 264/305; 264/DIG. 64
[58] Field of Search ..................... 156/242, 307.1, 156/307.3, 307.7; 264/243, 271.1, 275, 279, 303, 304, 305, 309, DIG. 64, DIG. 72, 306; 15/227, 229.11, 229.12; 2/161.3, 161.8

[56] References Cited

U.S. PATENT DOCUMENTS

| 836,181 | 11/1906 | Cray . | |
|---|---|---|---|
| 1,161,719 | 11/1915 | Norton . | |
| 1,559,114 | 10/1925 | Maranville . | |
| 1,979,130 | 10/1934 | Wiley . | |
| 2,030,494 | 2/1936 | Bireley et al. . | |
| 2,061,219 | 11/1936 | Wright . | |
| 2,167,037 | 7/1939 | Benner et al. | 264/136 |
| 2,269,721 | 1/1942 | Johnson . | |
| 2,663,890 | 12/1953 | Sullins . | |
| 2,722,706 | 11/1955 | Chopp . | |
| 2,747,229 | 5/1956 | Teague | 264/306 |
| 2,880,436 | 4/1959 | Hayden . | |
| 3,151,333 | 10/1964 | Scholz . | |
| 3,643,386 | 2/1972 | Grzyll . | |
| 4,107,840 | 8/1978 | Kupperman et al. . | |
| 4,218,779 | 8/1980 | Hart et al. . | |
| 4,371,987 | 2/1983 | Brasfield | 2/162 |
| 4,491,556 | 1/1985 | Fujii et al. | 264/271.1 |
| 4,593,427 | 6/1986 | Ortolivo . | |
| 4,621,388 | 11/1986 | Ortolivo . | |
| 4,788,733 | 12/1988 | Lerner | 15/227 |
| 4,864,661 | 9/1989 | Gimbel . | |
| 5,127,976 | 7/1992 | McLeish et al. . | |

FOREIGN PATENT DOCUMENTS

| 1135018 | 12/1956 | France . |
|---|---|---|
| 27 27 280 A1 | 12/1978 | Germany . |
| 6704835 | 10/1967 | Netherlands . |
| 2 113 977 | 8/1983 | United Kingdom . |
| 2 143 720 | 2/1985 | United Kingdom . |

OTHER PUBLICATIONS

Plastics Engineering Handbook, Fourth Edition, p. 400, figure 16-52 1976.

Primary Examiner—Michael W. Ball
Assistant Examiner—Richard Crispino
Attorney, Agent, or Firm—Fitch, Even, Tabin & Flannery

[57] ABSTRACT

A method of manufacturing a hand covering with a pad attached thereto wherein a pad is placed in a recess on a former, and a precursor material such as liquid latex is thereafter applied to the former and pad. The precursor material is then cured to form the hand covering, which is stripped from the former and everted for use with the pad bonded thereto.

15 Claims, 2 Drawing Sheets

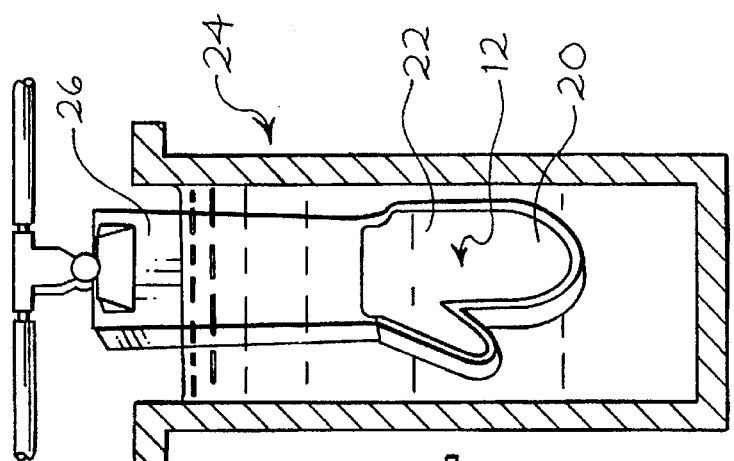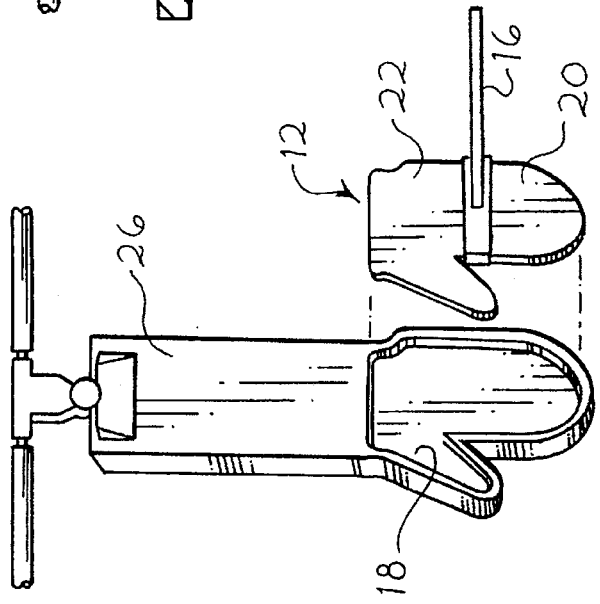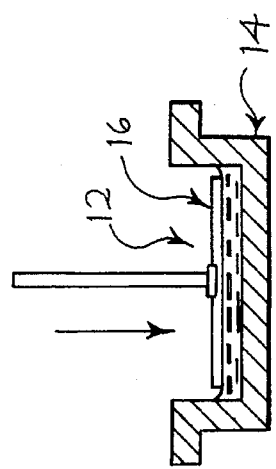

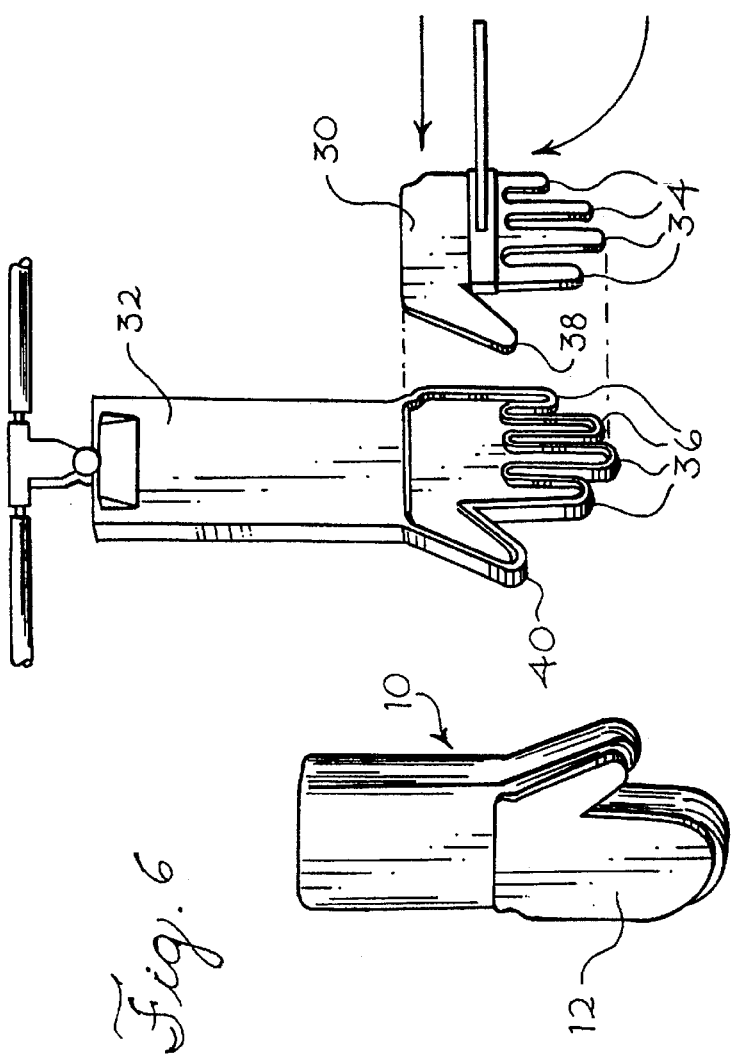
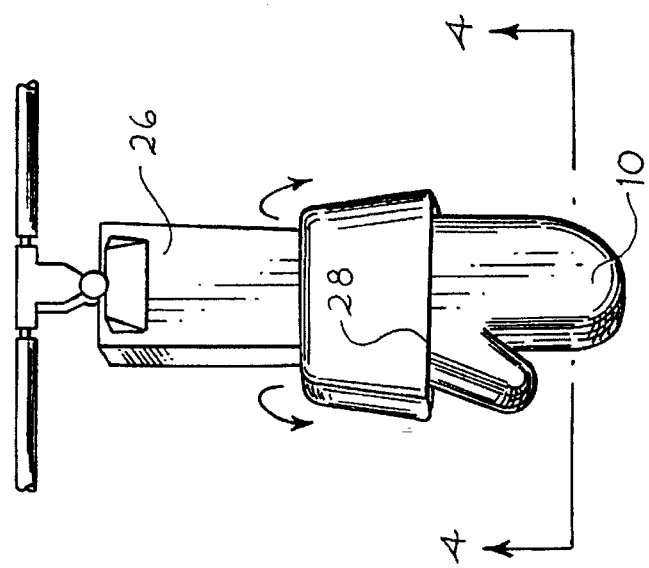

METHOD OF MANUFACTURING HAND COVERING WITH ATTACHED PAD

BACKGROUND OF THE INVENTION

1. Field of the Invention

The invention relates generally to hand coverings, and more particularly to a method of manufacturing a hand covering such as a mitten or a glove with a pad attached thereto.

2. Description of the Related Art

Flexible waterproof gloves have long been used for a variety of cleaning and other operations to protect the hands from exposure to deleterious substances. In recent years, there has been increased interest in hand coverings such as mittens or gloves having cleaning pads such as sponges or scour pads attached directly thereto. Such devices have been found to offer significant advantages in certain cleaning operations, as compared with manual gripping of a sponge, scour pad, or other cleaning device. The secure attachment of such a device to the hand covering eliminates the problem of dropping the cleaning device during the cleaning operation; and also facilitates the user's manipulation of the device to apply controlled pressure to a surface being cleaned. Products of this type may offer improved ergonomics, allowing better cleaning to be achieved, and permitting longer periods of cleaning.

One popular product of this type comprises a latex mitten having a sponge attached thereto by an adhesive. Another popular product of this type comprises a latex mitten having a scour pad attached thereto by an adhesive. In the past, these products have typically been manufactured in a relatively labor-intensive process wherein a former is dipped into a bath of liquid latex, and then, after curing of the latex, a pad having an adhesive thereon is pressed onto the mitten or sponge. Care must be taken to ensure that the pad is precisely located in a predetermined position on the mitten for purposes of utility as well as for aesthetic reasons. Providing a strong bond between the pad and the latex mitten without damaging either component is highly important, particularly in view of the fact that the pad typically may be subjected to relatively high mechanical forces during use, as well as exposure to any of a wide variety of cleaning agents. The product must be able to withstand such use without separation of the pad from the mitten during use.

In the past, various efforts have been made to address the problems inherent in manufacturing a product of this type. See, e.g., U.S. Pat. No. 5,127,976. However, there remains a need for a more efficient and economical method of manufacture.

A general object of the invention is to provide an improved method of manufacturing a hand covering with a pad attached thereto wherein a high quality, strong and dependable bond is provided between the pad and the hand covering, in an efficient and economical manner.

SUMMARY OF THE INVENTION

In accordance with the invention, there is provided a method of manufacturing a hand covering with a pad attached thereto wherein a pad is placed in a recess on a former and retained therein, and a precursor material is thereafter applied to the former with the pad attached thereto to at least partially cover the former and the exposed surface of the pad. The precursor material is then cured, hardened, solidified, or otherwise formed into a flexible material which is bonded to the pad to form a hand covering with the pad attached thereto. The hand covering is then removed from the former and everted so that the pad is disposed on the exterior of the hand covering.

The pad may be made of one or more materials suitable for cleaning, scouring, painting, or other uses. For example, pads for cleaning purposes may be made of natural or artificial sponge material, or may be made of woven or non-woven materials, such as scour pad materials such as those used in Scotch-Brite scour pads. For painting purposes, pads may be made of, e.g., materials commonly used in paint rollers.

The recess in the former may be dimensioned to have a depth approximately equal to the thickness of the pad, so that the exposed surface of the pad is substantially flush with the adjacent surrounding surface of the former when the pad is inserted into the recess. The precursor material may be a liquid latex material. To facilitate bonding of the hand covering material to the pad, a quantity of the precursor material may be applied to the surface of the pad which is to be bonded to the hand covering before the above-described application of the precursor material to the pad and former. The above-described application of the precursor material to the pad and former may be effected by dipping the pad and former into a bath of the precursor material. After application of the precursor material to the pad and former, and after curing of the precursor material to form the hand covering, the hand covering may be stripped from the former by everting the hand covering.

The method has several advantages. It does not require adhesive, and requires much less labor than methods used in the past wherein sponges or other pads were manually attached to latex mittens or gloves with a polyeurethane adhesive or the like.

In addition, it is believed that the method of the invention will provide a higher-quality bond, which will eliminate problems such as delamination, which may occur when adhesives are employed to attach sponges or other pads to latex gloves and mittens.

BRIEF DESCRIPTION OF THE DRAWINGS

FIG. 1 is a diagrammatic illustration of a pad being dipped in a liquid coating material in accordance with a method embodying the invention;

FIG. 2 is a diagrammatic illustration of a pad being inserted into a recess in a former in accordance with an embodiment of a method in accordance with the invention;

FIG. 3 is a diagrammatic illustration of a former with a pad thereon being dipped into a bath of liquid coating material in accordance with a method embodying the invention;

FIG. 4 is a sectional view taken substantially along line 4—4 in FIG. 5;

FIG. 5 is a perspective view of a former with a hand covering formed thereon, being stripped off of the former in accordance with a method embodying the invention;

FIG. 6 is a perspective view illustrating a hand covering manufactured in accordance with an embodiment of the invention; and FIG. 7 is a perspective view illustrating a pad being placed in a recess in a former in accordance with a second embodiment of the invention.

DESCRIPTION OF PREFERRED EMBODIMENT

The invention is generally embodied in a method of manufacturing a hand covering with a pad attached thereto.

FIGS. 1–6 illustrate a method in accordance with a first embodiment of the invention, wherein the hand covering comprises a mitten 10, and the pad 12 may comprise a sponge, a scour pad, a painting pad, or another type of pad. The pad may be made of one or more woven or non-woven materials. One material particularly suitable for use as a scour pad is the material used in Scotch-Brite scour pads. Another material which may be employed is a hook-and-loop fastener material, whereby the pad that is attached to the hand covering comprises an anchor or base to which cleaning pads or other pads of various types may be attached and detached. The pad in the embodiment of FIGS. 1–6 is preferably generally mitten-shaped, comprising a relatively small thumb portion and a larger finger portion as shown in, e.g., FIG. 2.

A first step of the illustrated method comprises dipping of the pad into a bath 14 of a precursor material or otherwise applying a layer 22 of precursor material thereto. As shown in FIG. 1, this may be conveniently accomplished with a relatively shallow bath of precursor material, by holding the pad with a holder 16, with the pad oriented generally horizontally, so that the bottom of the pad comes into contact with the precursor material. In the illustrated embodiment, the precursor material is a liquid, such as a liquid latex material. It should be appreciated that in other embodiments, other precursor materials might be employed.

After application of precursor material to the pad, the pad is placed in a recess 18 in generally mitten-shaped former 26 as illustrated in FIG. 2. It should also be appreciated that, in other embodiments, application of precursor material to the pad may be unnecessary, or may be accomplished by spraying on such material, rolling on such material, or otherwise applying such material.

When precursor material is applied to the pad before insertion of the pad 12 in the recess 18, the material is applied to the surface 20 which will be exposed after the pad is placed in the recess. That is, the precursor material is preapplied to the surface of the pad 12 that will face outward when the pad is in the recess on the former 26. Accordingly, if a dipping step as described above and shown in FIG. 1 is employed, the pad must be rotated 180° relative to the holder before insertion of the pad in the recess in the former 26. Thus, the surface 20, to which the precursor material is preapplied, faces away from the holder 16 during the dipping operation illustrated in FIG. 1, whereas the same surface 20 faces toward the holder 16 during insertion of the pad 12 in the recess 18 in the former, as shown in FIG. 2.

The holder 16, illustrated in FIGS. 1 and 2, comprises a bar having projections at its ends, which grip the sides of the pad. In other embodiments of the invention, a different type of holder may be employed. The holder in other embodiments of the invention may comprise a structure having one or more fingers with curved, pointed tines, which penetrate the pad to support the pad, rather than gripping the sides of the pad. The depth of the recess is preferably selected so as to be substantially equal to the thickness of the pad, so that after the pad is inserted in the recess, the outwardly facing surface of the pad is substantially flush with the surrounding surface of the former, or slightly raised relative thereto.

The former 26 with the pad thereon is preferably dipped into a bath 24 of liquid precursor material as illustrated in FIG.. 3 to coat the former and the pad with the precursor material. The dipping step may be repeated one or more times as necessary to build up a sufficient thickness of material on the former and pad. The precursor material may be one which cures upon exposure to air, such that partial curing takes place after an initial dipping, and prior to a subsequent dipping.

The term "curing" is used broadly herein to refer to any process which converts a precursor material into a hand covering material. In a preferred embodiment, this curing comprises transformation of a liquid latex precursor material into a flexible elastic latex rubber material. In other embodiments, other materials such as synthetic rubber, other elastomers, or PVC might employed. The curing process may include heating the hand covering or precursor in an oven.

During or after curing of the precursor material, but before removal of the hand covering from the former, a flocking or other coating may be applied to the exposed surface of the hand covering being formed, if desired. Flocking or other coating may be applied, for example, to increase comfort, to absorb perspiration on the wearer's hands, or to lower friction between the hand covering and the user's hand to facilitate insertion and removal of the user's hand.

As illustrated in FIG. 5, the hand covering 10 is preferably removed from the former 26 by everting the hand covering and stripping it from the former. This may be accomplished by gripping the upper edge 28 of the hand covering and pulling it downward toward the end of the former 26, or may be accomplished in other ways in other embodiments of the invention, either manually or with the use of a mechanical stripper.

As shown in FIG. 5, the recess 18 may be sized such that its depth is approximately equal to the thickness of the pad 12. In the embodiment illustrated in FIG. 4, the depth of the recess 18 is substantially equal to the combined thickness of the pad and the coating of material which is preapplied to the pad. In other embodiments, the depth of the recess may be slightly less, so that the pad projects slightly from the recess. The thickness of the layer 22 of precursor material preapplied to the pad may be very small, i.e., the material may comprise only a thin film, and the illustration of the layer of precursor material in FIG. 4 is not intended necessarily to be drawn to scale. Furthermore, after dipping and curing, the hand covering material is preferably integral with the material preapplied to the pad. The hand covering 10 and the layer 22 of material preapplied to the pad are shown as separate layers in FIG. 4 for illustrative purposes only. After stripping and everting the hand covering 10 as shown in FIG. 5, the pad 12 is disposed on the exterior surface of the hand covering and is ready for use, as shown in FIG. 6.

In the finished product as shown in FIG. 6, the hand covering and pad are preferably substantially inseparable from one another.

FIG. 7 illustrates a pad 30 and former 32 employed in a second embodiment of the invention, wherein a glove, rather than a mitten, is formed. The pad and former have individual finger portions 34 and 36 thereon, in addition to thumb portions 38 and 40. The method in accordance with the second embodiment of the invention is substantially the same as the method of the first embodiment, except for the difference in the configuration as described above.

From the foregoing it should be appreciated that the invention provides a novel and useful method of manufacturing a hand covering with a pad attached thereto. The method is further described in the following claims.

What is claimed is:

1. A method of manufacturing a hand covering with a pad attached thereto comprising:

providing a pad;

providing a former having a recess therein shaped to receive said pad;

placing said pad in said recess in said former;

applying to said former and said pad a precursor material which is capable of forming a flexible elastic material, while maintaining said pad in said recess;

curing said material and bonding said material to said pad to form a hand covering with said pad attached thereto;

removing said hand covering with said pad attached thereto from said former; and everting said hand covering with said pad attached thereto so that said pad is disposed on the exterior of said hand covering.

2. A method of manufacturing a hand covering with a pad attached thereto in accordance with claim 1 wherein providing a former having a recess therein shaped to receive said pad comprises providing a former having a recess which has a depth substantially equal to the thickness of said pad.

3. A method in accordance with claim 1 wherein said hand covering with said pad attached thereto is everted as it is removed from said former.

4. A method in accordance with claim 1 wherein the step of applying said material to said former and said pad comprises dipping said former and said pad into a bath of said material.

5. A method in accordance with claim 4 further comprising the step of applying a quantity of said material only to an outwardly facing surface of said pad before dipping said former and said pad.

6. A method in accordance with claim 1 wherein said pad includes hook-and-loop fastener elements thereon.

7. A method in accordance in claim 1 wherein said precursor material is a liquid latex material.

8. A method in accordance with claim 1 wherein said pad comprises a cleaning pad.

9. A method in accordance with claim 1 wherein said pad comprises a sponge.

10. A method in accordance with claim 1 wherein said pad comprises a scour pad.

11. A method of manufacturing a latex hand covering with a cleaning pad attached thereto comprising:

providing a cleaning pad;

providing a former having a recess therein shaped to receive said cleaning pad;

placing said cleaning pad in said recess in said former;

applying to said former and said cleaning pad a precursor latex material which is capable of forming a flexible elastic latex material, while maintaining said pad in said recess;

curing said latex material and thereby bonding said material to said pad to form a hand covering with said pad attached thereto;

removing said hand covering with said pad attached thereto from said former; and everting said hand covering with said pad attached thereto so that said pad is disposed on the exterior of said hand covering.

12. A method of manufacturing a latex hand covering with a pad attached thereto in accordance with claim 11 wherein providing a former having a recess therein shaped to receive said pad comprises providing a former having a recess which has a depth slightly less than the thickness of said pad.

13. A method in accordance with claim 11 wherein said cleaning pad comprises a sponge.

14. A method in accordance with claim 11 wherein said cleaning pad comprises a scour pad.

15. A method in accordance with claim 11 further comprising preapplying a layer of said precursor latex material only to a first surface of said pad prior to insertion of said pad into said recess in said former, and orienting said pad in said recess such that said layer of said latex precursor material is facing outward.

* * * * *